(12) United States Patent
Deng et al.

(10) Patent No.: US 12,260,277 B2
(45) Date of Patent: Mar. 25, 2025

(54) RFID TAG

(71) Applicant: Confidex Oy, Tampere (FI)

(72) Inventors: Will Deng, Guangzhou (CN); Heikki Ahokas, Tampere (FI); Miika Pylvänäinen, Tampere (FI)

(73) Assignee: Confidex Oy, Tampere, FL (US)

( * ) Notice: Subject to any disclaimer, the term of this patent is extended or adjusted under 35 U.S.C. 154(b) by 0 days.

(21) Appl. No.: 18/267,232

(22) PCT Filed: Dec. 18, 2020

(86) PCT No.: PCT/CN2020/137663
§ 371 (c)(1),
(2) Date: Jun. 14, 2023

(87) PCT Pub. No.: WO2022/126618
PCT Pub. Date: Jun. 23, 2022

(65) Prior Publication Data
US 2024/0062033 A1 Feb. 22, 2024

(51) Int. Cl.
G06K 19/06 (2006.01)
G06K 19/07 (2006.01)
G06K 19/077 (2006.01)

(52) U.S. Cl.
CPC ... *G06K 19/07728* (2013.01); *G06K 19/0723* (2013.01); *G06K 19/0779* (2013.01)

(58) Field of Classification Search
CPC ....... G06K 19/07749; G06K 19/07773; G06K 19/07728; G06K 19/07; G06K 19/0779; G06K 19/0723
USPC ................................. 235/492, 487
See application file for complete search history.

(56) References Cited

U.S. PATENT DOCUMENTS

| 2004/0125040 | A1* | 7/2004 | Ferguson | H01Q 1/38 343/895 |
| 2007/0040686 | A1 | 2/2007 | Reis | |
| 2007/0046475 | A1 | 3/2007 | Carrender | |
| 2007/0240304 | A1 | 10/2007 | Eisenhardt et al. | |
| 2008/0088448 | A1* | 4/2008 | Steidinger | H01Q 1/40 343/873 |

(Continued)

FOREIGN PATENT DOCUMENTS

| CN | 101292272 | 10/2008 |
| CN | 104428946 | 3/2015 |

(Continued)

OTHER PUBLICATIONS

International Search Report and Written Opinion in corresponding International Patent Application No. PCT/CN2020/137663, mailed Sep. 26, 2021 (9 pages).

(Continued)

*Primary Examiner* — Daniel St Cyr
(74) *Attorney, Agent, or Firm* — Leason Ellis LLP

(57) ABSTRACT

An RFID tag (1) comprises a substrate (2), an inlay (3), an antenna (4) and an integrated circuit on a chip (5) coupled to the antenna (4). The substrate (2) has a front surface (6), a back surface (7), a first side edge (8) and a second side edge (9). The inlay (3) comprises the antenna (4) and has a fold (10) that is configured to fold over one side edge (8, 9) of the substrate (2) from the front surface (6) to the back surface (7). At least the inlay (3) comprises at least one opening (12).

9 Claims, 5 Drawing Sheets

(56) References Cited

U.S. PATENT DOCUMENTS

| | | | |
|---|---|---|---|
| 2008/0122631 A1* | 5/2008 | Kodukula | G08B 13/2448 |
| | | | 340/572.8 |
| 2009/0184824 A1* | 7/2009 | Forster | G06K 19/07749 |
| | | | 340/572.1 |
| 2011/0315774 A1 | 12/2011 | Baba et al. | |
| 2013/0126622 A1* | 5/2013 | Finn | H05K 3/103 |
| | | | 29/601 |
| 2015/0227829 A1 | 8/2015 | Finn et al. | |
| 2016/0019452 A1 | 1/2016 | Forster | |
| 2019/0074574 A1* | 3/2019 | Augustine | A61F 13/36 |
| 2020/0193260 A1 | 6/2020 | Forster | |

FOREIGN PATENT DOCUMENTS

| | | |
|---|---|---|
| CN | 110110833 | 8/2019 |
| CN | 209265490 | 8/2019 |

OTHER PUBLICATIONS

Extended European Search Report in EP Application No. 20965632.1-1201/4264490, mailed Jul. 22, 2024 (7 pages).

* cited by examiner

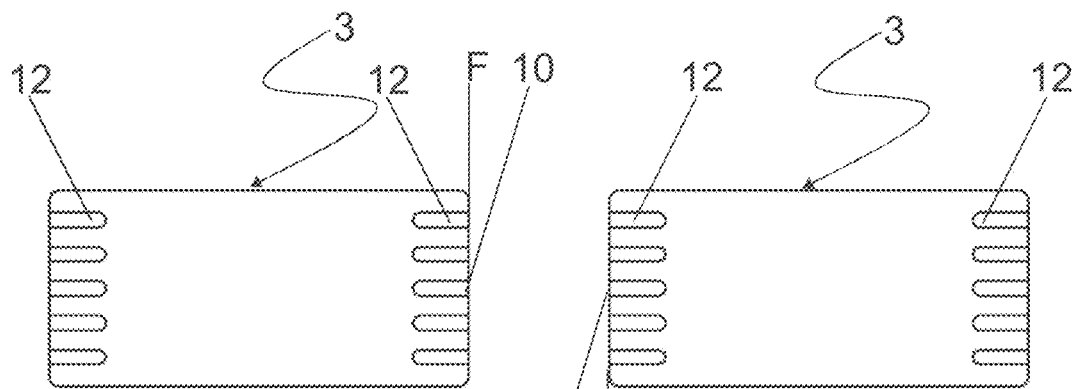
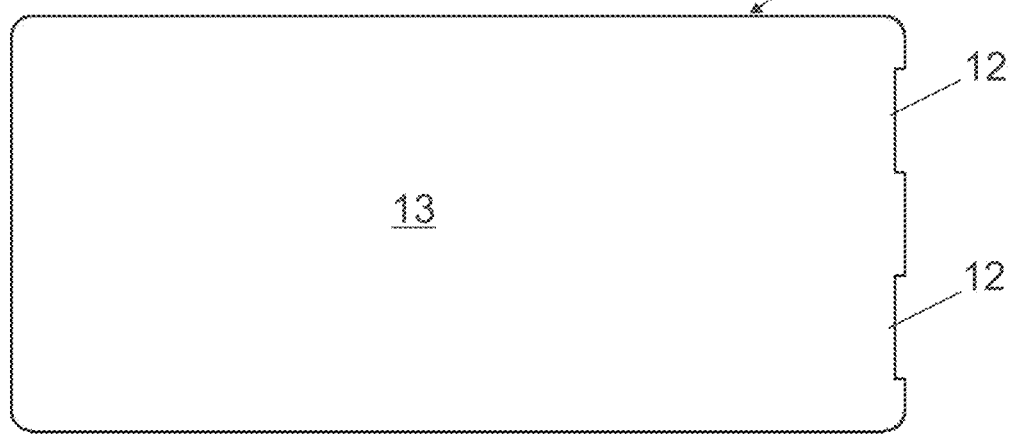
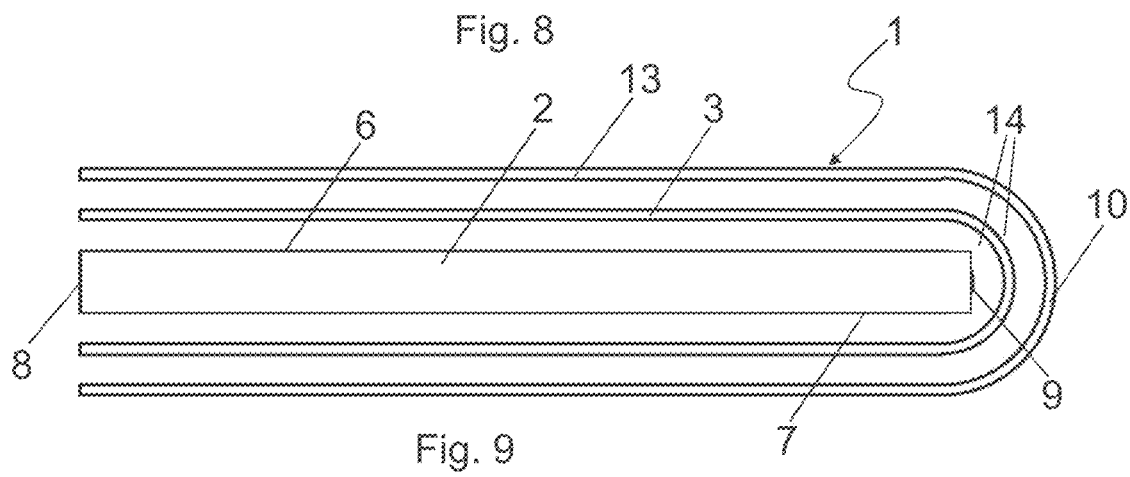

RFID TAG

This patent application is a U.S. National Phase Application under 35 U.S.C. § 371 of International Patent Application No. PCT/CN2020/137663, filed on Dec. 18, 2020, which is incorporated by reference as if expressly set forth in its entirety herein.

FIELD OF THE INVENTION

The present invention relates to an RFID tag that comprises a substrate, an inlay, an antenna and an integrated circuit on a chip coupled to the antenna. The substrate has a front surface, a back surface, a first side edge and a second side edge. The inlay comprises the antenna and has a fold that is configured to fold over one side edge of the substrate from the front surface to the back surface.

BACKGROUND OF THE INVENTION

One of the problems associated with the above folded RFID tag is that the RFID tag bends when it is reeled on a roll core, or it is attached to a curved surface. Due to bending the RFID tag becomes wrinkled and detuned since a distance between the antenna part that is on the front surface and the antenna part that is on the back surface, changes that leads to a change in impedance. The change in impedance causes a frequency shift and a drop in performance. It is possible that the RFID tag loses its performance up to 50%.

BRIEF DESCRIPTION OF THE INVENTION

An object of the present invention is to solve the above problem. The objects of the invention are achieved by an RFID tag which is characterized by what is stated in the independent claim. The preferred embodiments of the invention are disclosed in the dependent claims.

An advantage of the present RFID tag is that it can be bend without losing its performance, i.e. it is not detuned.

The RFID tag comprises a substrate, an inlay, an antenna and an integrated circuit on a chip coupled to the antenna. The substrate is usually a flat rectangular sheet that has a front surface, a back surface, a first side edge and a second side edge. The substrate may be of dielectric material. The inlay may be attached to the substrate by a dielectric adhesive.

The inlay comprises the antenna. The inlay may be made of polyethylene terephthalate (PET), for example. The antenna is formed on the surface of the inlay. The antenna may be of aluminium. The antenna may work at UHF frequencies between 850 MHz and 960 MHz.

The inlay has a fold that is configured to fold over one side edge of the substrate from the front surface to the back surface. The antenna on the surface of the inlay extends over the fold from the front surface to the back surface. It is also possible that the inlay comprises two folds, one over the first side edge of the substrate and another over the second side edge of the substrate. The antenna on the surface of the inlay extends over the folds from the front surface to the back surface.

There may be other layers on top of the inlay. The RFID tag may comprise a face layer on the inlay. There may be other layers between the inlay and the face layer but at its simplest there may be only the face layer. The face layer may be of paper, PET, or polypropylene (PP). The face layer may have a printable surface.

The printable surface means in this context that the surface can be printed by a printer-encoder that is designed for printing RFID tags and the print quality is sufficient e.g. for flawless barcodes. The printable surface may be a separate layer, such as a paper or plastic layer, or it may be a layer which already has a certain task in the structure and it has the printable surface as an excess feature, i.e. there is no separate layer for printing. However, the printable surface may be covered with a lacquer or a coating in order to enhance printability.

The inlay or the other layers with the inlay comprise at least one opening. The at least one opening guides wrinkling in such a manner that detuning is prevented. Naturally, the inlay may comprise more than one opening. The opening or openings may lie close to the fold or folds. The opening or openings may lie close to the side edge in a zone that is from the side edge 5 mm inwards, for example.

The inlay or the other layers with the inlay may comprise a row of openings at each fold. The openings at the fold increase flexibility in addition to their beneficial effect on the detuning. The row may be parallel to the side edge over which the inlay or the other layers with the inlay extends. If only the inlay has openings and the face layer covers the inlay the end user does not see the openings. However, if all layers of the RFID tag are punched the openings are visible in the ready-made RFID tag.

The opening may be, for example, an elongated aperture, a circular hole, an array of circular holes, or a slit to mention just a few. The openings may pierce the antenna. In order to demonstrate the size of the openings, the elongated apertures have a width and a length so that the width may be from 0.50 mm to 3.00 mm, for example. The length of the elongated apertures depends on the overall size of the RFID tag. The bigger the size the longer the apertures can be.

In addition to the manufacturing process and storing the RFID tags on a roll the openings are also advantageous when the RFID tag is placed on a curved surface in its end use. The curved surface may be, for example, a barrel or a roll. The openings give to the RFID tag more flexibility so that they easily conform to the curved surface.

The RFID tags may be manufactured by a roll-to-roll process. The RFID tags may be adhesively attached to a release liner. The RFID tags may lie on a web, such as a release liner, in such a manner that there are sequential and/or parallel RFID tags on the web. The first and second side edge of the RFID tag are parallel to the machine direction of the web. The RFID tags may be printed one after the other when they are on the surface of the web or a sheet.

BRIEF DESCRIPTION OF THE DRAWINGS

In the following the invention will be described in greater detail by means of preferred embodiments with reference to the attached drawings, in which

FIG. 7a shows the front side of the inlay of FIG. 5;

FIG. 7b shows the back side of the inlay of FIG. 5;

FIG. 8 shows a front view of an RFID tag;

FIG. 9 shows a cross-sectional view of an RFID tag of FIG. 8;

DETAILED DESCRIPTION OF THE INVENTION

Figure 1:
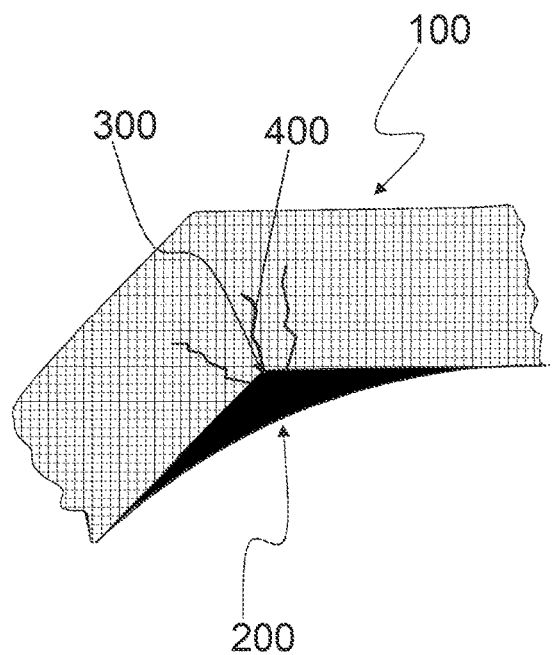
FIG. 1 shows a partial side view of a folded RFID tag of prior art.

FIG. 1 shows a partial side view of a folded RFID tag 100 of prior art. RFID tags are usually manufactured in a roll to roll process where a web comprising sequential RFID tags is reeled on a surface 200 of a curved roll core. The web of folded RFID tags 100 does not follow the surface 200 smoothly but forms bends 300 to some of the RFID tags 100. Wrinkles 400 may appear at the bends. The bend 300 causes detuning of the RFID tag 100, i.e. the read range of the RFID tag 100 is diminished. As the roll comprises multiple web layers there may be a remarkable number of detuned RFID tags 100.

Figure 2:
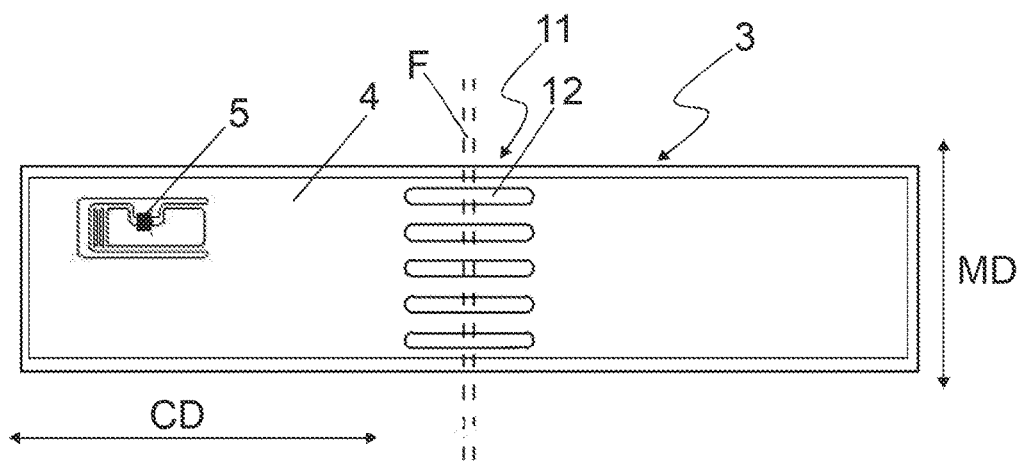
FIG. 2 shows an inlay from above.
Figure 12A:
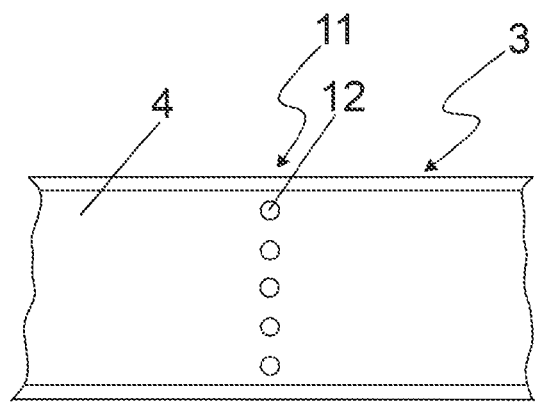
FIG. 12a shows a front view of an inlay.
Figure 12B:
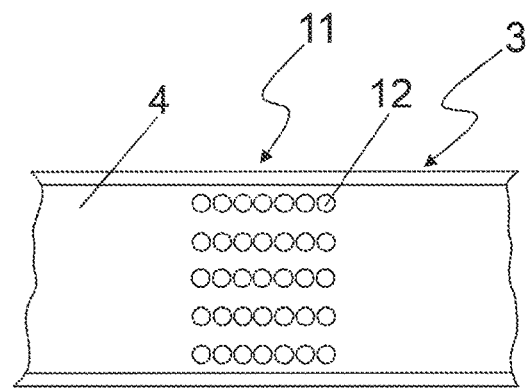
FIG. 12b shows a front view of an inlay.
Figure 12C:
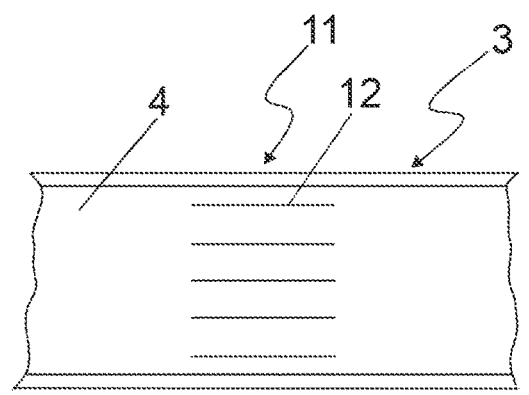
FIG. 12c shows a front view of an inlay.

FIG. 2 shows an inlay 3 from above. The inlay 3 comprises an antenna 4 and an integrated circuit on a chip 5 coupled to the antenna 4. The placing of the chip 5 may be different depending on the shape of the antenna 4. The inlay 4 comprises a row 11 of openings 12 that are cut through the inlay 4 and usually also through the antenna 4. The openings 12 are elongated apertures in FIG. 2 but their shape may vary. The opening 12 may be, for example, a circular hole, a row of circular holes or a slit as shown in FIGS. 12a, 12b and 12c. Dashed lines F show the area where the inlay is due to bend.

Figure 5:
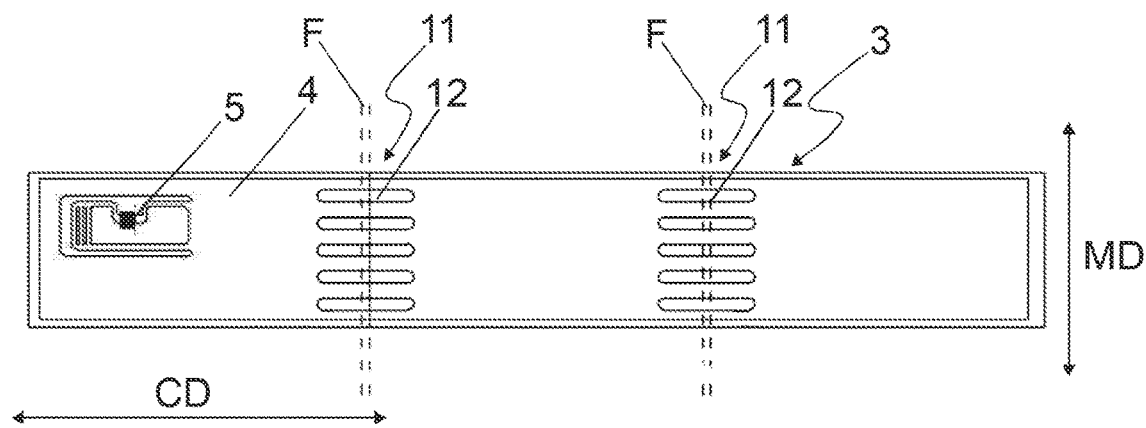
FIG. 5 shows an inlay from above.

Regarding both FIGS. 2 and 5 the chip 5 should not be in the area demarcated by the dashed lines F. As the RFID tags 1 are usually manufactured in a roll-to-roll process it is shown in FIGS. 2 and 5 how the inlay 3 is situated in respect of the machine direction MD and cross direction CD on a web comprising sequential and/or parallel RFID tags 1.

Figure 3:
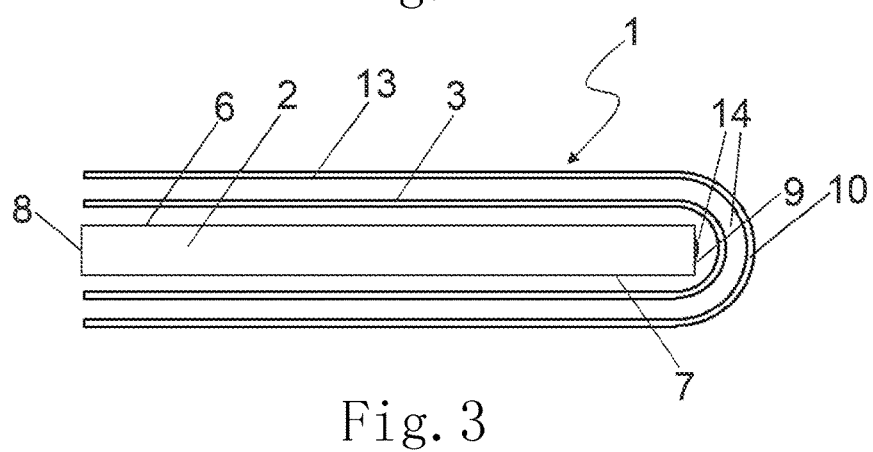
FIG. 3 shows a cross-sectional view of an RFID tag comprising the inlay of FIG. 2.

FIG. 3 shows a cross-sectional view of an RFID tag 1. The RFID tag 1 comprises a face layer 13, an inlay 3 and a substrate 2. The face layer 13 may be a printable surface. The inlay 3 is as explained in connection with FIG. 2. The face layer 13, the inlay 3 and the substrate 2 are attached together by adhesive layers 14.

Figures 4A, 4B:
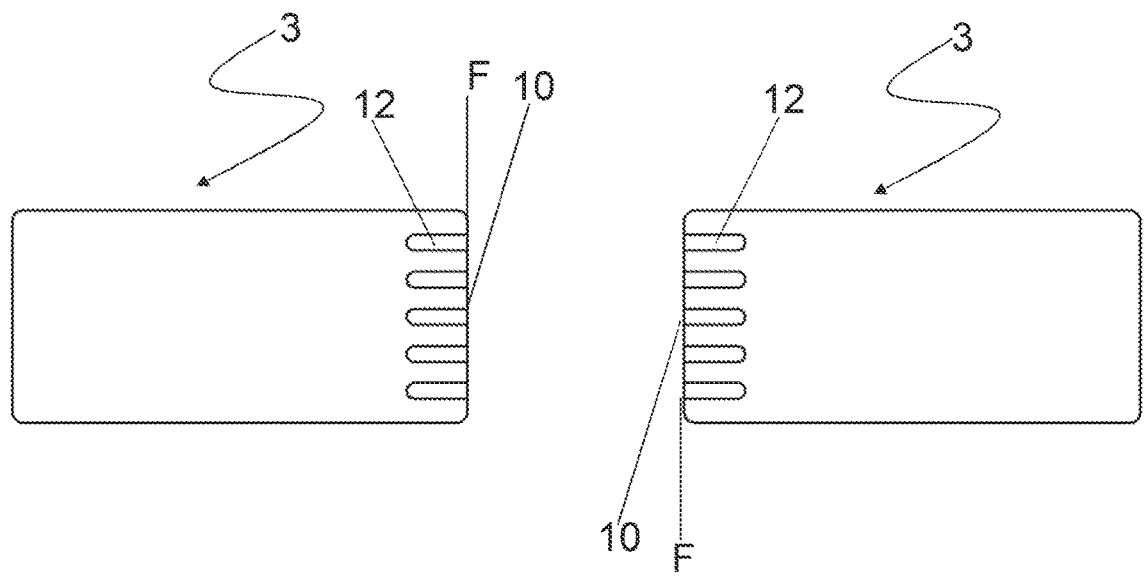
FIG. 4a shows the front side of the inlay of FIG. 2.
FIG. 4b shows the back side of the inlay of FIG. 2.

FIG. 4a shows the front side of the inlay 3 of FIG. 2 when it is bent. FIG. 4b shows the back side of the inlay 3 of FIG. 2 when it is bent. The area of the dashed lines F is now at the fold 10.

FIG. 5 shows another inlay 3 from above. The inlay 3 comprises an antenna 4 and an integrated circuit on a chip 5 coupled to the antenna 4. The placing of the chip 5 may be different depending on the shape of the antenna 4. The inlay 4 comprises two rows 11 of openings 12 that are cut through the inlay 4. The openings 12 are elongated apertures in FIG. 5 but their shape may vary. The opening 12 may be, for example, a circular hole, a row of circular holes or a slit as shown in FIGS. 12a, 12b and 12c. Dashed lines F show two areas where the inlay 3 is due to bend.

Figure 6:
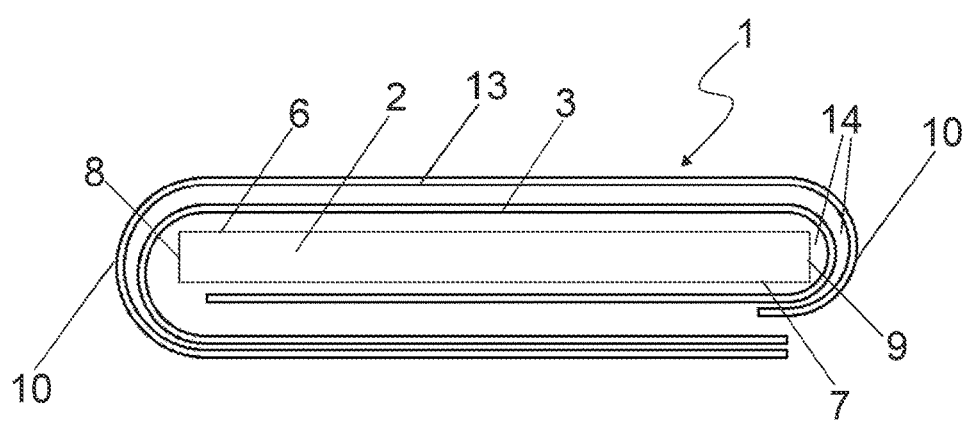
FIG. 6 shows a cross-sectional view of an RFID tag comprising the inlay of FIG. 5.

FIG. 6 shows a cross-sectional view of an RFID tag 1. The RFID tag 1 comprises a face layer 13, an inlay 3 and a substrate 2. The face layer 13 may be a printable layer. The inlay 3 is as explained in connection with FIG. 5. The face layer 13, the inlay 3 and the substrate 2 are attached together by adhesive layers 14.

FIG. 7a shows the front side of the inlay 3 of FIG. 5 when it is bent over the side edges of the substrate 2. FIG. 7b shows the back side of the inlay 3 of FIG. when it is bent over the side edges of the substrate 2. The areas of the dashed lines F are now at the fold 10 on the opposite sides of the inlay 3.

FIG. 8 shows a front view of an RFID tag 1. A face layer 13 is the outermost layer. The RFID tag 1 comprises openings 12 that penetrate through the RFID tag 1 from the first surface 6 to the second surface 7, i.e. the face layer 13 and the inlay 3 may become punched twice and the substrate 2 once. In the case of FIG. 8 the side edge 9 comprises the openings 12 but naturally it can also be the side edge 8 that has the openings 12.

FIG. 9 shows a cross-sectional view of an RFID tag 1. The RFID tag 1 comprises a face layer 13, an inlay 3 and a substrate 2. The face layer 13 may be a printable layer. The inlay 3 in the RFID tag 1 may be as explained in connection of FIG. 2 except that the openings 12 are formed after the structure of the RFID tag 1 is ready. The face layer 13, the inlay 3 and the substrate 2 are attached together by adhesive layers 14.

Figure 10:
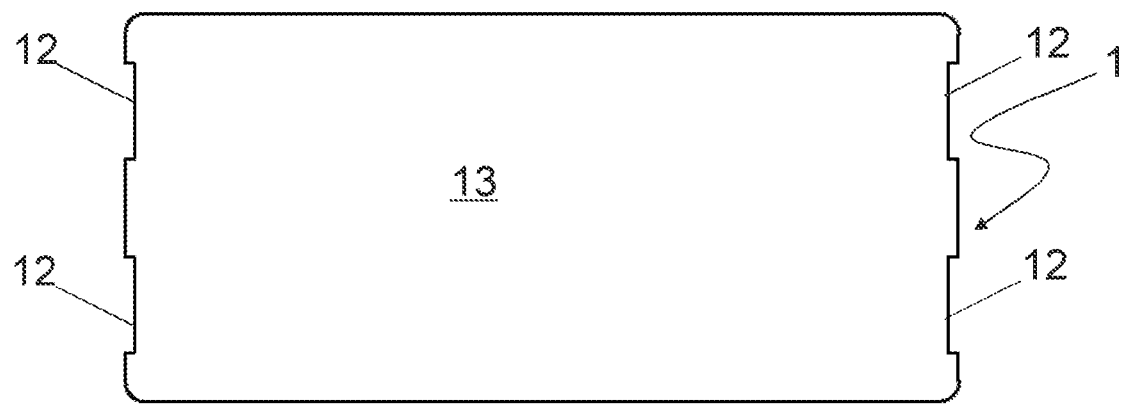
FIG. 10 shows a front view of an RFID tag.

FIG. 10 shows a front view of another RFID tag 1. A face layer 13 is the outermost layer. The RFID tag 1 comprises openings 12 at both edges 8, 9 that penetrate through the RFID tag 1 from the first surface 6 to the second surface 7, i.e. the face layer 13 and the inlay 3 may become punched twice and the substrate 2 once.

Figure 11:
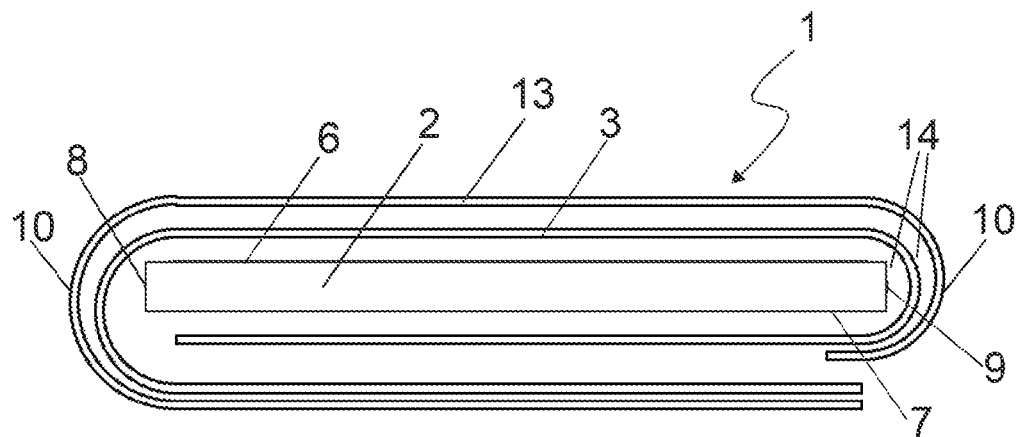
FIG. 11 shows a cross-sectional view of an RFID tag of FIG. 10.

FIG. 11 shows a cross-sectional view of an RFID tag 1. The RFID tag 1 comprises a face layer 13, an inlay 3 and a substrate 2. The face layer 13 may be a printable layer. The inlay 3 in the RFID tag 1 may be as explained in connection of FIG. 5 except that the openings 12 are formed after the structure of the RFID tag 1 is ready. The face layer 13, the inlay 3 and the substrate 2 are attached together by adhesive layers 14.

FIG. 12a shows a front view of an inlay 3 having a row 11 of openings 12. The openings 12 are circular holes.

FIG. 12b shows a front view of an inlay 3 having a row 11 of openings 12. The openings 12 are an array of sequential circular holes 12.

FIG. 12c shows a front view of an inlay 3 having a row 11 of openings 12. The openings 12 are slits that are made without removing material.

Figure 13:
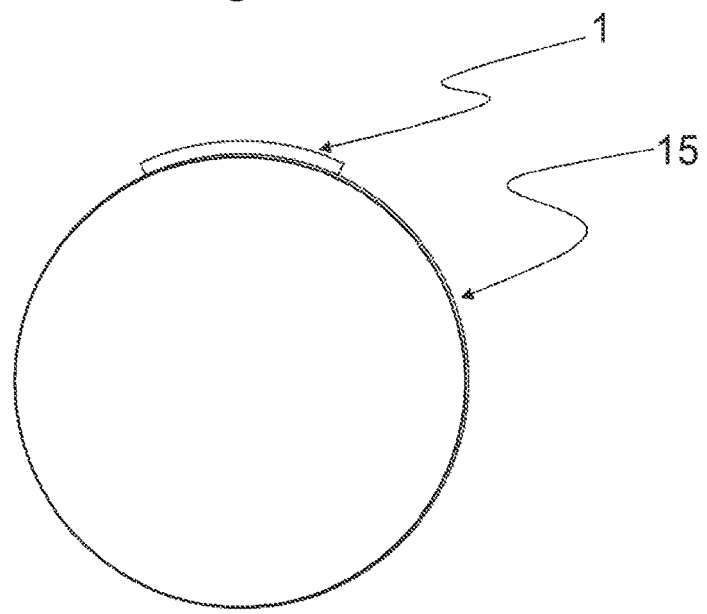
FIG. 13 shows a cross-sectional view of a curved surface with an RFID tag.

FIG. 13 shows a cross-sectional view of a curved surface 15 which an RFID tag 1 has been applied. Openings 12 at a fold 10 enhance the RFID tag 1 to conform to the curved surface 15 because the openings 12 give flexibility to the RFID tag 1. Thus, the openings 12 are significant also after the manufacturing process in the ready-made RFID tag 1.

It will be obvious to a person skilled in the art that, as the technology advances, the inventive concept can be implemented in various ways. The invention and its embodiments are not limited to the examples described above but may vary within the scope of the claims.

The invention claimed is:

1. An RFID tag (1) that comprises a substrate (2), an inlay (3), an antenna (4)) on the surface of the inlay and an integrated circuit on a chip (5) coupled to the antenna (4), the substrate (2) has a front surface (6), a back surface (7), a first side edge (8) and a second side edge (9), the inlay (3) has a fold (10) that is configured to fold over one side edge (8, 9) of the substrate (2) from the front surface (6) to the back surface (7) in such a manner that the antenna extends over the fold, wherein at least the inlay (3) comprises a row (11) of openings (12) at the fold (10), the row (11) being parallel to said side edge (8, 9).

2. The RFID tag according to claim 1, wherein the inlay (3) comprises one fold (10) that is configured to fold over the first side edge (8) and another fold (10) that is configured to fold over the second side edge (9) and the inlay (3) comprises a row (11) of openings (12) at both folds (10).

3. The RFID tag according to claim 1, wherein the RFID tag (1) comprises a face layer (13) on the inlay (3).

4. The RFID tag according to claim 3, wherein the inlay (3) and the face layer (13) comprises a fold (10) that is configured to fold over one side edge (8, 9) of the substrate (2) from the front surface (6) to the back surface (7), the face layer (13), the inlay (3) and the substrate (2) comprises a row (11) of openings (12) at the fold (10), the row (11) being parallel to the at least one side edge (8, 9).

5. The RFID tag according to claim 3, wherein the inlay (3) and the face layer (13) comprises one fold (10) that is configured to fold over the first side edge (8) and another fold (10) that is configured to fold over the second side edge (9) and the face layer (13), the inlay (3) and the substrate (2) comprises a row (11) of openings (12) at both folds (10).

6. The RFID tag according to claim 1, wherein the opening (12) is an elongated aperture.

7. The RFID tag according to claim 1, wherein the opening (12) is a circular hole.

8. The RFID tag according to claim 1, wherein the opening (12) is an array of sequential circular holes.

9. The RFID tag according to claim 1, wherein the opening (12) is a slit.

\* \* \* \* \*